(12) United States Patent
Bloebaum

(10) Patent No.: US 7,443,785 B2
(45) Date of Patent: Oct. 28, 2008

(54) SELECTIVE ERROR CORRECTION FOR AD HOC NETWORKS HAVING MULTIPLE COMMUNICATION MODES

(75) Inventor: Leland Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 965 days.

(21) Appl. No.: 10/803,139

(22) Filed: Mar. 18, 2004

(65) Prior Publication Data

US 2005/0207350 A1  Sep. 22, 2005

(51) Int. Cl.
    *H04J 1/16* (2006.01)
(52) U.S. Cl. ............................. 370/216; 370/252; 714/2
(58) Field of Classification Search ............... 370/252, 370/253, 310, 338, 392; 714/774, 776
    See application file for complete search history.

(56) References Cited

U.S. PATENT DOCUMENTS

| | | | |
|---|---|---|---|
| 5,327,438 A | | 7/1994 | Okuyama |
| 6,389,022 B1 * | | 5/2002 | Jeong et al. ............... 370/395.2 |
| 6,553,038 B1 | | 4/2003 | Fukuda |
| 6,571,291 B1 * | | 5/2003 | Chow ........................ 709/230 |
| 6,839,347 B1 * | | 1/2005 | Ishida et al. ................ 370/389 |
| 6,970,436 B2 * | | 11/2005 | Park ........................ 370/310.1 |
| 7,099,256 B2 * | | 8/2006 | Wada et al. ............... 369/59.21 |
| 2003/0185186 A1 * | | 10/2003 | Tsutsumi et al. ........... 370/338 |
| 2004/0090924 A1 * | | 5/2004 | Giaimo et al. ............. 370/252 |
| 2004/0125750 A1 * | | 7/2004 | Katti et al. ................ 370/252 |
| 2004/0181741 A1 * | | 9/2004 | Hata et al. ................ 714/776 |

FOREIGN PATENT DOCUMENTS

EP   0 938 206 A2   8/1999
EP   1 059 775 A1   12/2000

OTHER PUBLICATIONS

Excerpts of Bluetooth Specification Version 1.1, May 8, 2001, pp. 52-53, 58-61, 72-74, 44, 66.
Bluetooth "Specification vol. 1, Core, Version 1.1" *Specifications of the Bluetooth System* pp. 35-181 (2001).
International Search Report and Written Opinion of International Searching Authority for Application No. PCT/US2004/037337 mailed on Apr. 6, 2005.

* cited by examiner

*Primary Examiner*—Ricky Ngo
*Assistant Examiner*—Kan Yuen
(74) *Attorney, Agent, or Firm*—Myers Bigel Sibley & Sajovec

(57) ABSTRACT

Error control is provided in an ad hoc network having an asynchronous communication mode and a synchronous communication mode. A packet including a header and a payload is received. The header includes a header error check (HEC) computed based on the header. An error indicator is calculated based on the received header. The received payload is forwarded if the calculated error indicator indicates an error free header. The header, only in the synchronous communication mode, is modified based on an error correction table when the calculated error indicator corresponds to a value in the error correction table and the received payload is forwarded. A received packet error is detected in the synchronous communication mode when the calculated error indicator indicates an error in the header and the calculated error indicator does not correspond to a value in the error correction table. A received packet error is detected in the asynchronous communication mode when the calculated error indicates an error in the header.

23 Claims, 4 Drawing Sheets

SELECTIVE ERROR CORRECTION FOR AD HOC NETWORKS HAVING MULTIPLE COMMUNICATION MODES

FIELD OF THE INVENTION

This invention relates to wireless communications, and more particularly to error correction for wireless communications.

BACKGROUND OF THE INVENTION

Various ad hoc communication networks support packet communications in an asynchronous communication mode and/or a synchronous communication mode. The different communication modes may be used, for example, to support different services. For example, a synchronous communication link may be more appropriate for a demanding service, such as voice. One example of such an ad hoc network is a Bluetooth compliant network. The Bluetooth 1.1 standard ("BT-1.1") specifies packets that include an access code, header and payload as illustrated in FIG. 1A. As will be more fully described below, the header is protected by a cyclical redundancy check (CRC) that is generally effective at detecting errors but not designed to correct errors. As one of the header fields may indicate a destination device for a packet, an indeterminate header error could lead to unintended reception by an incorrect device in the same Bluetooth piconet. As a result, the BT-1.1 standard specifies that a receiver discard any packets with errors detected by a bad CRC check on the packet header. This packet-handling approach is provided based on the requirements of a data-communications environment where the Bluetooth link is shared by multiple devices that may transmit bursts of data asynchronously. For such asynchronous communication mode operations, the destination of a packet is generally not known in advance to the receiver, which, therefore, operates to accept only its own packets.

Bluetooth also provides for support of various applications using a synchronous communication mode. For example, the BT-1.1 standard provides for supporting a real time application such as voice. In such a case, Bluetooth provides a synchronous link in which the transmissions are scheduled in advance to occur at regular intervals so that a receiver may know when to expect packets for the synchronous link. Dropped packets due to bad header CRC results may adversely affect voice quality in such a real-time application as with, for example, a Bluetooth headset.

The BT-1.1 standard will now be more fully described with reference to the baseband (BB) packet illustrated in FIG. 1A. As illustrated in FIG. 1A, the access code is 72 bits in length. The access code may be used by the receiver for timing recovery, frequency offset determination and compensation and/or channel access control functions. During normal link operations after a Bluetooth piconet has been established, a Channel Access Code (CAC) may be used to identify the particular piconet. Two other access codes, the Device Access Code (DAC) and the Inquiry Access Code (IAC) may be used during the piconet establishment procedures of paging and inquiry, respectively.

The header illustrated in FIG. 1A is 54 bits in length. The header may contain information for packet acknowledgement, packet sequence number for reordering, flow control, identity of the slave device within the Bluetooth piconet that is the intended destination or the source of the packet and/or the header error check (HEC), which is a type of cyclical redundancy check (CRC). As specified by the BT-1.1 standard, an 8-bit HEC is computed for a 10-bit header data field to form an 18-bit header. The 18-bit header may be protected by a rate-1/3 repeat code to form a 54-bit field as illustrated in FIG. 1A. The repeat code is specified for use in improving the signal to noise ratio at the receiver rather than for use in connection with an error correction code decoding processing at the receiver.

Also shown in FIG. 1A is the payload. The payload may be 0 bits for a null packet or range from 240 bits to 2,745 bits in length for data packets. The 240 bit length payload may be supported within a single time slot of the Bluetooth specified frame structure. Greater payload lengths may be supported by allocating multiple time slots within a frame for a single packet. The payload can contain data for either a synchronous connection-oriented (SCO) link or an asynchronous connection-less (ACL) link. Each payload type (ACL or SCO) may be provided a variety of different options for error correction, including no coding, rate 2/3 block and/or rate 1/3 sequential repeat code. The format of coding for the payload may be established at the time of negotiation of a link between a master and a slave device on a Bluetooth piconet.

Further details of the BT-1.1 standard format of the header are illustrated in FIG. 1B. As shown in FIG. 1B, the header includes a member address (AMER_ADDR) distinguishing between active members participating on a piconet, a packet type (TYPE), a flow control bit (FLOW) for flow control of packets over the asynchronous link, a one bit acknowledgement indication (ARQN) to acknowledge successful transfer of payload data, a sequence bit (SEQN) providing a sequential numbering scheme for ordering data in a packet stream and a header-error-check (HEC) to check the header integrity.

SUMMARY OF THE INVENTION

Some embodiments of the present invention provide error control in an ad hoc network having an asynchronous communication mode and a synchronous communication mode. A packet including a header and a payload is received. The header includes a header error check (HEC) computed based on the header. An error indicator is calculated based on the received header. The received payload is forwarded if the calculated error indicator indicates an error free header. The header, only in the synchronous communication mode, is modified based on an error correction table when the calculated error indicator corresponds to a value in the error correction table and the received payload is forwarded. A received packet error is detected in the synchronous communication mode when the calculated error indicator indicates an error in the header and the calculated error indicator does not correspond to a value in the error correction table. A received packet error is detected in the asynchronous communication mode when the calculated error indicates an error in the header.

In other embodiments of the present invention, the error indicator is a remainder value. The header may include n data bits and the error correction table may be an n-entry table, each of the entries corresponding to an error in an associated one of the data bits. The ad hoc network may be a Bluetooth compliant network and detecting a received packet error may include discarding the received payload. The header may have an eighteen bit length and the HEC may be eight bits of the header. The received header may be a repeat coded header and receiving the packet may include demodulating the repeat coded header to provide the header including the HEC.

In further embodiments of the present invention, detecting a received packet error further includes discarding the received payload. The header further includes a destination device address and modifying the header includes determining a destination device address based on the modified header and forwarding the received payload when the determined destination device address corresponds to an expected destination device address. A received packet error is detected and the received payload is discarded when the determined destination device address does not correspond to the expected destination device address.

In other embodiments of the present invention, the synchronous connection-oriented (SCO) link is negotiated to establish the synchronous communication mode. A frame time is associated with the SCO link. A packet received at about the frame time is characterized as a synchronous communication mode received packet. Modifying the header, only in the synchronous communication mode, includes modifying the header only for the synchronous communication mode received packets. Packets not received at about the frame time may be characterized as asynchronous communication mode received packets and forwarding the received payload may include forwarding the received payload for asynchronous communication mode received packets having a destination device address corresponding to an expected destination device address and discarding the received payload for asynchronous communication mode received packets having a destination device address not corresponding to the expected destination device address.

In further embodiments of the present invention, modifying the header includes, for synchronous mode received packets, forwarding the received payload when the determined destination device address corresponds to the expected destination device address and detecting a received packet error and discarding the received payload when the determined destination device address does not correspond to the expected destination device address. The error indicator may be a remainder value and calculating the remainder value may include calculating the remainder value based on a generator polynomial and an initial value known to a device receiving a packet and a device transmitting the packet. Negotiating a synchronous connection-oriented (SCO) link may include establishing the initial value for the SCO link.

In other embodiments of the present invention, a bit error rate for the SCO link is estimated. Modifying the header is disabled when the estimated bit error rate fails to satisfy an error correction criterion.

In further embodiments of the present invention, error control in an ad hoc network includes receiving a packet including a header and a payload, the header including a header error check (HEC) computed based on the header. An error indicator is calculated based on the received header. The received payload is forwarded if the calculated error indicator indicates an error free header. The header is modified based on an error correction table when the calculated error indicator corresponds to a value in the error correction table and the received payload is forwarded based on the modified header. A received packet error is detected when the calculated error indicator indicates an error in the header and the calculated error indicator does not correspond to a value in the error correction table.

In other embodiments of the present invention, a communication device for an ad hoc network having an asynchronous communication mode and a synchronous communication mode includes a receiver configured to receive a packet including a header and a payload, the header including a header error check (HEC) computed based on the header. The device further includes an error detect circuit configured to calculate an error indicator based on the received header and an error correction circuit configured to modify the header based on an error correction table when the calculated error indicator corresponds to a value in the error correction table. The error correction circuit is configured to modify the header only in the synchronous communication mode. The device also includes a payload processing circuit configured to forward the received payload when the calculated error indicator indicates an error free header and/or when the error correction circuit modifies the header and to detect a received packet error when the calculated error indicator indicates an error in the header and the calculated error indicator does not correspond to a value in the error correction table in the synchronous communication mode and to detect a received packet error in the asynchronous communication mode when the calculated error indicator indicates an error in the header.

In further embodiments of the present invention, the payload processing circuit is further configured to discard the received payload if a received packet error is detected. The payload processing circuit may be further configured to discard the received payload if a received packet error is detected. The header may further include a destination device address and the error correction circuit may be configured to determine a destination device address based on the modified header. The payload processing circuit may be configured to forward the received payload when the determined destination device address corresponds to an expected destination device address and to detect a received packet error and discard the received payload when the determined destination device address does not correspond to the expected destination device address.

DETAILED DESCRIPTION

Figure 1A:
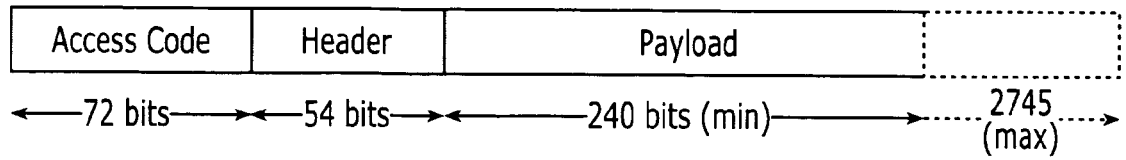
FIG. 1A illustrates a baseband packet for a BT1.1 standard Bluetooth network.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. It will also be understood that the term "and/or" as used herein refers to and encompasses any and all possible combinations of one or more of the associated listed items.

The present invention is described below with reference to block diagrams and/or operational illustrations of methods and wireless terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The invention is generally described herein in the context of wireless terminals that can communicate over an ad hoc, typically short-range (i.e., low power), communication channel, such as a Bluetooth communication channel, with network accessible devices or other wireless devices.

As used herein, a "wireless terminal" or "mobile terminal" includes, but is not limited to, a terminal that is configured to communicate via a wireless interface such as, for example, a cellular interface, a wireless local area network interface (WLAN), Bluetooth interface, another RF communication interface, and/or an optical interface. Example wireless terminals include, but are not limited to, a cellular wireless terminal; a personal communication terminal that may combine a cellular wireless terminal with data processing, facsimile and data communications capabilities; a personal data assistance (PDA) that can include a wireless transceiver, pager, Internet/intranet access, local area network interface, wide area network interface, Web browser, organizer, and/or calendar; and a mobile or fixed computer or other device that includes a wireless transceiver. The wireless terminal may be configured to communicate via a cellular communication link that may include a protocol such as, for example, ANSI-136, Global Standard for Mobile (GSM) communication, General Packet Radio Service (GPRS), enhanced data rates for GSM evolution (EDGE), code division multiple access (CDMA), wideband-CDMA, CDMA2000, and UMTS.

As understood by those who are skilled in the art, the Bluetooth protocol provides a universal radio interface in the 2.45 GHz unlicensed frequency band between electronic devices that connect and communicate wirelessly via short-range ad hoc networks. Communication protocols as used herein may specify the information communicated, the timing, the frequency, the modulation, and/or the operations for setting-up and/or maintaining a communication connection.

As will be appreciated by one of skill in the art, the present invention may be embodied as a method or device, such as a mobile terminal or other ad hoc protocol supporting devices like headphones or the like. Accordingly, the present invention may take the form of an entirely hardware embodiment, an entirely software embodiment or an embodiment combining software and hardware aspects, all generally referred to herein as a "circuit."

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart illustration and/or block diagram block or blocks.

The computer program instructions may also be loaded onto a computer or other programmable data processor to cause a series of operational steps to be performed on the computer or other programmable processor to produce a computer implemented process such that the instructions that execute on the computer or other programmable processor provide steps for implementing the functions or acts specified in the flowchart illustration and/or block diagram block or blocks.

Figure 2:
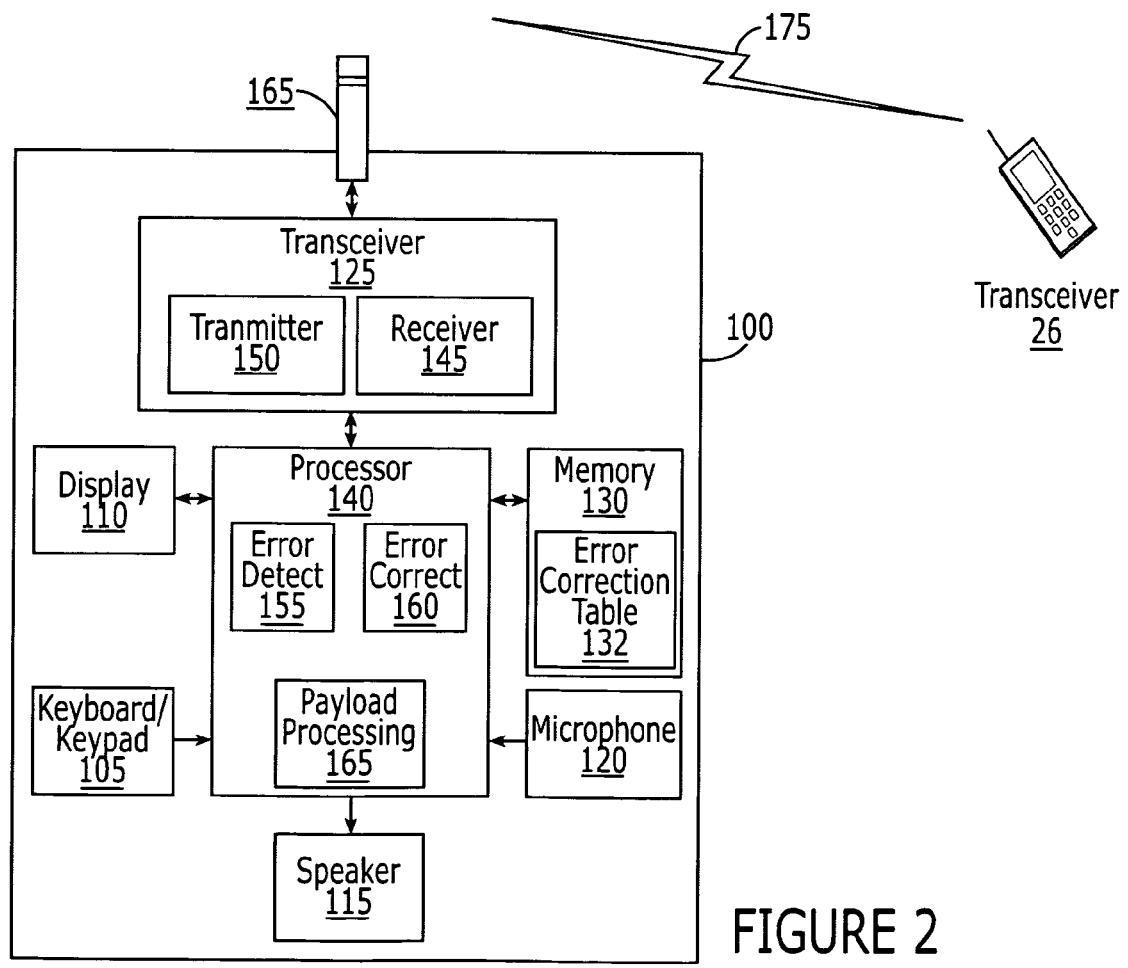
FIG. 2 is a schematic block diagram illustrating a communication device, such as a mobile terminal, according to some embodiments of the present invention.

Embodiments of the present invention will now be further described with reference to the schematic block diagram illustration of a mobile terminal 200 in FIG. 2. FIG. 2 illustrates a mobile wireless terminal 200 receiving an ad hoc wireless communication network signal 175. The mobile terminal 200 may include a keyboard/keypad 105, a display 110, a speaker 115, a microphone 120, a network transceiver 125, and a memory 130 that communicate with a processor 140. The network transceiver 125 typically comprises a transmitter circuit 150 and a receiver circuit 145, which respectively transmit outgoing radio frequency signals to an ad hoc network transceiver 26 of the network and receive incoming radio frequency signals from the transceiver 26 via an antenna 165. While a single antenna 165 is shown in FIG. 2, it is to be understood that multiple antennas and/or different types of antennas may be utilized based on the types of signals being received. The radio frequency signals transmitted between the mobile terminal 200 and the transceiver 26 may comprise both traffic and control signals (e.g., paging signals/messages for incoming voice/data), which are used to establish and maintain communication with another device, and may provide uplink and/or downlink communications. However, the present invention is not limited to such two-way communication systems.

With respect to their role in various conventional operations of the mobile terminal 200, including cellular network communications, the foregoing components of the mobile terminal 200 may be included in many conventional mobile terminals and their functionality is generally known to those skilled in the art. It should be further understood, that, as used herein, the term "mobile terminal" or "wireless terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver, an accessory device supporting wireless communications and a conventional laptop and/or palmtop receiver or other device that includes a radio transceiver. Mobile terminals may also be referred to as "pervasive computing" devices.

Also shown in the mobile terminal 200 of FIG. 2 is an error detect circuit 155 that is configured to calculate an error indicator based on the received header. For example, the error indicator may be a remainder value. The mobile terminal 200 of FIG. 2 further includes an error correction circuit 160 configured to modify a header based on an error correction table when the calculated error indicator corresponds to a value in an error correction table 132. For example, the error correction table 132 may be stored in the memory 130. The error correction circuit 160 in the embodiments of FIG. 2 is configured to modify the header only when the terminal 200 is in the synchronous communication mode (i.e., receives a packet designated for a synchronous connection-oriented (SCO) link).

Also shown in FIG. 2 is a payload processing circuit 165. The payload processing circuit 165 is configured to forward a received payload when the calculated error indicator from the error detect circuit 155 indicates an error free header and/or when the error correction circuit 160 modifies the header. The payload processing circuit 165 may be further configured to detect a received packet error when the calculated error indicator indicates an error in the header and the calculated error indicator does not correspond to a value in the error correction table for a packet received in the synchronous communication mode. The payload processing circuit 165 may be configured to detect a received packet error in the asynchronous communication mode when the calculated error indicator indicates an error in the header.

The payload processing circuit 165 in some embodiments of the present invention is further configured to discard a received payload if a received packet error is detected. In addition, the payload processing circuit 165 may be further configured to discard a received packet based on a received packet error when a determined destination device address for a packet processed by the error detect circuit 155 and the error correction circuit 160 does not correspond to the expected destination device address (i.e., the address of the receiving device). In such embodiments, the error correction circuit 160 may be configured to determine the destination device address based on the modified header selected by the error correction circuit 160.

While the error detect circuit 155, error correction circuit 160 and payload processing circuit 165 are illustrated in the embodiments of FIG. 2 as implemented on the processor 140, it will be understood that the functionality of the different circuits may be distributed across multiple processors. Furthermore, the allocation of functionality between the respective error detect 155, error correction 160 and payload processing 165 circuits may be distributed differently between the respective circuits and the present invention is not limited to embodiments having a particular distribution of functionality as described above with reference to FIG. 2. It will also be understood that, while embodiments of the present invention have been described with reference to a mobile terminal 200 above, the communication device for an ad hoc network may be a variety of other devices having either one or two way communication support, such as headsets and/or other accessory devices or the like.

Figure 3:
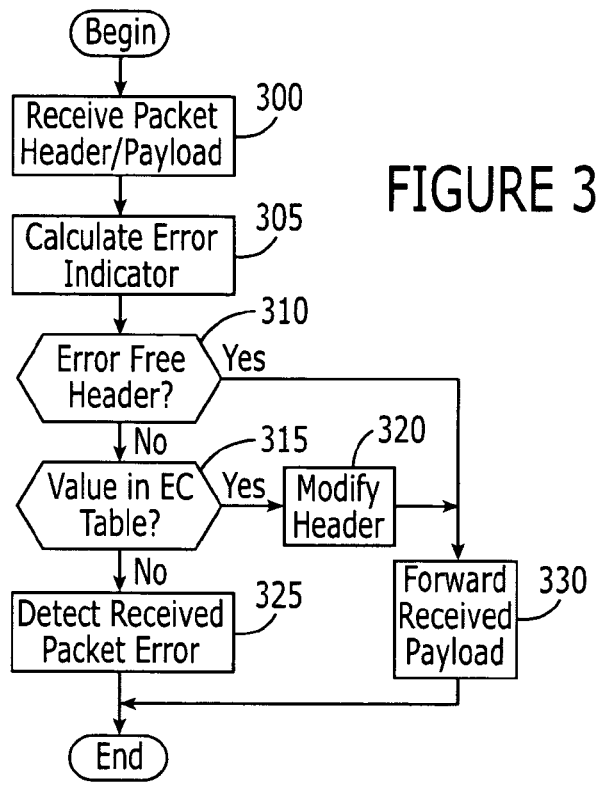
FIG. 3 is a flowchart illustrating operations for error control in an ad hoc network according to various embodiments of the present invention.

Operations for error control in an ad hoc network having an asynchronous communication mode and a synchronous communication mode will now be described for various embodiments of the present invention with reference to the flow chart illustration of FIG. 3. As shown in FIG. 3, operations begin at Block 300 by receiving a packet including a header and a payload. The header includes a header error check (HEC) computed based on the header and included in the header at the transmitting device. An error indicator is calculated based on the received header (Block 305). As will be described more fully with reference to the exemplary embodiments of FIG. 6, the error indicator may be a remainder value.

Based on the calculated error indicator, it is determined if the received header is an error free header (Block 310). If the header is not error free, it is determined if the calculated error indicator corresponds to a value in the error correction table (Block 315). If the calculated error indicator does not correspond to a value in the error correction table, a received packet error is detected (Block 325). If the calculated error indicator does correspond to a value in the error correction table, the header is modified (Block 320).

The received payload is forwarded if the calculated error indicator indicates an error free header at Block 310 or after modifying the header at Block 320 (Block 330). Operations described with reference to Blocks 315 and 320 may be carried out only in the synchronous communication mode of the receiving device. Accordingly, it will be understood that, in an asynchronous communication mode, if an error is detected in the header at Block 325, then a received packet error is detected. Where a received error is detected at Block 325, the receiving device may discard the payload rather than forwarding the payload.

Figure 4:
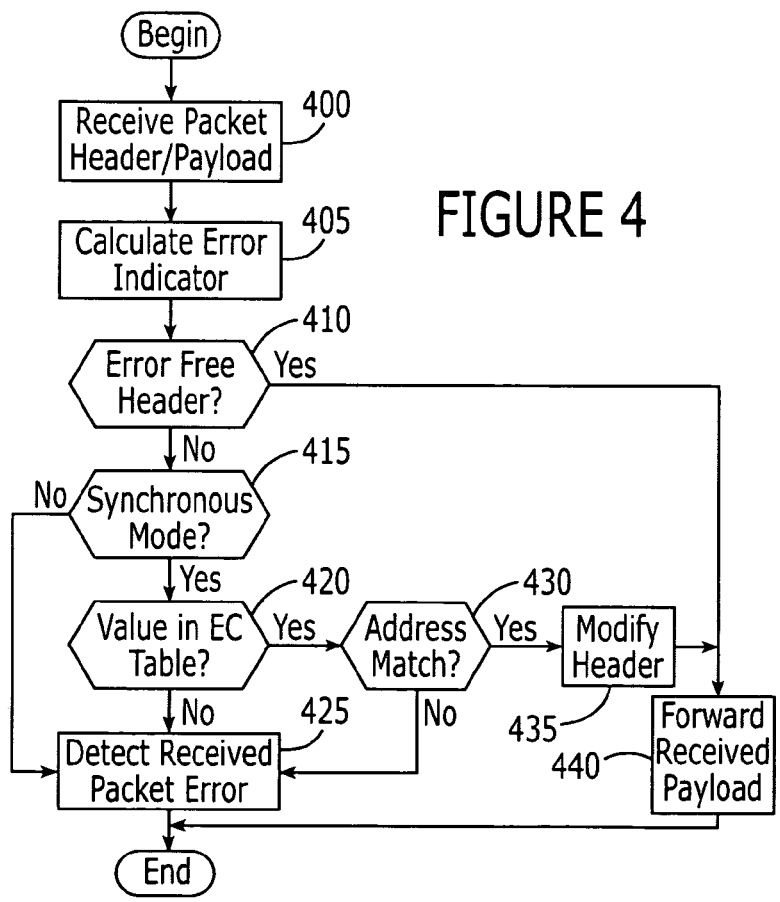
FIG. 4 is a flowchart illustrating operations for error control in an ad hoc network according to further embodiments of the present invention.

Operations for error control in an ad hoc network having an asynchronous communication mode and a synchronous communication mode for further embodiments of the present invention will now be described with reference to the flow chart illustration of FIG. 4. Operations begin at Block 400 by receiving a packet including a header and a payload, where the header includes a header error check (HEC) computed based on the header. An error indicator is calculated based on the received header (Block 405). If the calculated error indicator indicates an error free header (Block 410), the received payload is forwarded (Block 440). If the calculated error indicator does not indicate an error free header (Block 410) and the packet was received in an asynchronous communication mode (Block 415) a received packet error is detected (Block 425). In a synchronous communication mode (Block 415), it is determined if the calculated error indicator from Block 405 corresponds to a value in an error correction (EC) table (Block 420). If not, a received packet error is detected (Block 425). If the calculated error indicator corresponds to a value in the error correction table (Block 420), the destination device address is determined based on a candidate modified header, and if the determined destination device address does not correspond to an expected destination device address (Block 430), a received packet error is detected (Block 425).

For example, an SCO link may be negotiated and set up for a particular master and slave pair of devices. Therefore, as synchronous communication mode may be determined based on the presumption that a packet received at a particular time is associated with such a specific SCO link, if the modified address generated by the error correction logic described above indicates a destination device having a different address, there likely was an error in either the assumption that the received packet was associated with a particular SCO link or that the modified header does not accurately correct an error in the received packet. For example, in embodiments of the present invention providing for single bit error correction, a particular multi-bit error condition may correspond to an error table value associated with a distinct single bit error resulting in a possible modified header that does not correct an error but, instead is itself erroneous.

If the destination device address based on the modified header corresponds to an expected destination device address (Block 430), the header is modified based on the error correction table (Block 435). The received payload associated with the successfully modified header is forwarded to the destination device address (Block 440).

Figure 5:
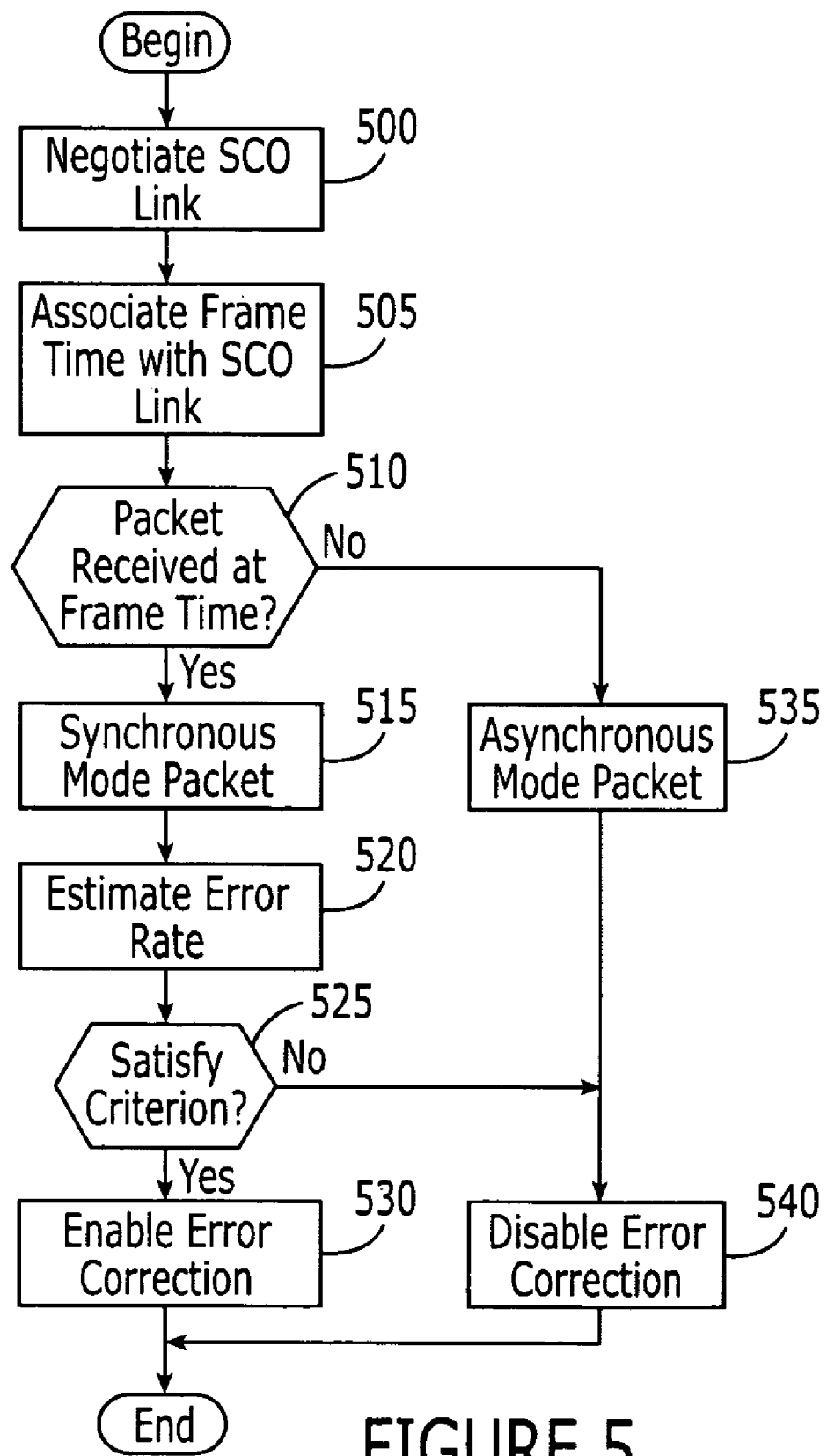
FIG. 5 is a flowchart illustrating operations for error control in an ad hoc network according to various embodiments of the present invention.

Operations for error control in an ad hoc network related to determining whether error correction should be enabled or disabled will now be further described with reference to the flowchart illustration of FIG. 5. As shown in FIG. 5, operations begin at Block 500 by negotiating a synchronous connection-oriented (SCO) link between a master and slave device to establish a synchronous communication mode. The negotiation of the SCO link at Block 500 may establish various aspects of the SCO link, including aspects such as a frame and time slot associated with the SCO link. Accordingly, a particular frame time may be associated with the SCO link (Block 505). If a packet is received at the associated frame time of the SCO link (Block 510), the packet is characterized as a synchronous communication mode received packet (Block 515). Otherwise, the packet is characterized as an asynchronous communication mode received packet (Block 535).

In some embodiments of the present invention, as illustrated by Blocks 520 and 525 of FIG. 5, the use of error correction even in synchronous communication mode may be limited. For example, in some embodiments of the present invention, the error correction table may be configured specifically to correct only single bit errors and may be subject to an unacceptable risk of false header correction above a certain bit error rate for a channel. An exemplary analysis including an estimate of a false correction rate risk at various bit error rates will be described below.

In light of the potential for false error correction, some embodiments of the present invention provide for estimating an error rate for the link (Block 520). In such embodiments of the present invention, if the estimated bit error rate for the SCO link fails to satisfy an error correction criterion (Block 525), error correction is disabled (Block 540). If the criterion is satisfied (Block 525), error correction is enabled (Block 530). Thus, if there are error rates at which the risk of false correction is unacceptable, header modification based on an error correction table may be disabled in both synchronous communication mode and asynchronous communication mode.

Figure 1B:
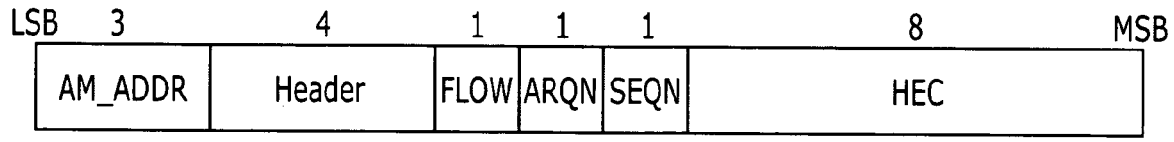
FIG. 1B illustrates a header for a BT1.1 standard Bluetooth network baseband packet.

In various embodiments of the present invention described herein, header error correction is disabled in asynchronous communication mode without regard to a channel bit error rate as the receiver may use information in the header to determine the packet destination and other control information associated with the asynchronous communication link. Accordingly, a bit error in one of the header fields illustrated in FIG. 1B could cause the receive and transmit link control states to diverge, which may result in a significant deterioration of communication performance. Therefore, error correction as described herein may be limited to SCO links where the receive destination address for a packet may be known in advance based on knowledge of when an SCO packet burst should occur as established at the time of negotiation of the SCO link.

Figure 6:
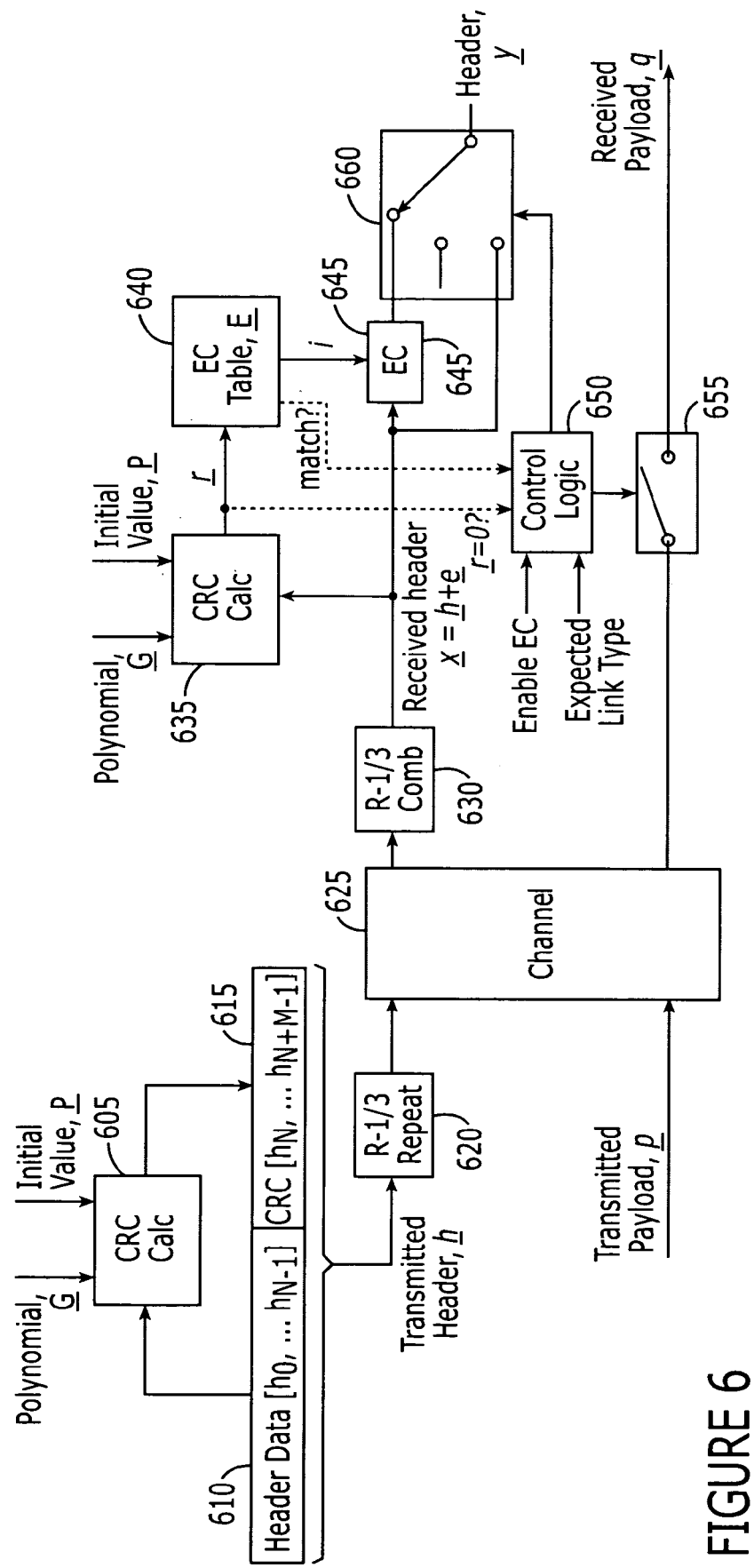
FIG. 6 is a schematic block diagram illustrating a communication device according to some embodiments of the present invention.

The present invention will now be further described with reference to the schematic block diagram of various embodiments of the present invention illustrated in FIG. 6. The embodiments in FIG. 6 may provide improved performance of an SCO link by reducing HEC error rates for such a link. The embodiments of FIG. 6 are particularly directed to an ad hoc network based on the BT-1.1 standard of Bluetooth. As shown in FIG. 6, Blocks 605 through 620 illustrate the computation of a header h by the Bluetooth transmitter which is transmitted with the payload p over the channel 625. An M-bit cyclical redundancy check (CRC) 615 is computed on the M-bit header data 610 by the CRC calculation circuit 605 using a generator polynomial G and an initial value P that is known by both the transmitter and the receiver. The (N+M)-bit header h is rate-1/3 repeat-coded per the Bluetooth BT-1.1 standard and then transmitted together with the payload p over the channel 625 to the receiver. At the receiver, including Blocks 630 through 660 of FIG. 6, the received header x (after combining with repeated bits) is given by:

$$x = h + e,$$

where e is an (N+M)-bit error vector for which $e_i = 1$ represents an error in the $i^{th}$ received bit of h. The rate-1/3 combiner 630, as described previously, may be used in demodulating a received signal to advantageously improve the signal to noise ratio using the rate-1/3 repeat coded received signal to generate the received header x. The receiver CRC calculation circuit 635 calculates the CRC remainder r on the received vector x, using techniques known to those of skill in the art, based on the polynomial G and the initial value P. The remainder value may then indicate that the header x was received error free (i.e., e=0) and, if so, the control logic 650 may forward the received payload as schematically indicated by the switch 655 in FIG. 6. As shown in FIG. 6, an error free indication corresponds to a remainder value r of 0.

If the remainder value r is not equal to 0 (i.e., e is not equal to 0) the remainder value r is compared to entries in an error correction table E 640. For the embodiments of FIG. 6, the error correction table E has N entries with the $i^{th}$ entry $E_i$ corresponding to the CRC remainder resulting from a single bit error in the $i^{th}$ position of the header h, such that:

$$E_i = r(e_i), i = 0 \ldots N-1.$$

For some embodiments of the present invention, the table E can be precomputed based on the fixed value of G and then stored for usage during link activity. In case $r = E_i$, the $i^{th}$ bit in x may be corrected by the error correction EC circuit 645. If r does not match any value in the table E 640, then no correction may occur and the no match indication may be provided to the control logic block 650 to prevent forwarding of the payload as illustrated by the switch 655 in FIG. 6. Thus, the match indication may be combined in the control logic block 650 with expected link type information (SCO or ACL) and an Enable EC control indicator (such as based on a determination or estimate of channel 625 error rate) to allow the error correction to be enabled and/or disabled under software control. An exemplary control logic for allowing error correction according to some embodiments of the present invention is as follows:

```
IF r = 0,
    Pass on payload q to higher layers;
ELSEIF (Enable EC == 1 AND Expected Link Type == SCO),
    Compare r to all values in EC table E;
    IF Match to entry i,
        Correct i^th bit in data section of header;
        Pass on payload q to higher layer;
    ELSE
        Indicate packet erasure to higher layer.
ELSE,
    Indicate packet erasure to higher layer.
```

An exemplary analysis including an estimate of a false correction rate risk at various bit error rates will now be described. If the single-bit probability of an error is p and individual bit errors are assumed independent, then the probability P of i errors in an N-bit word is given by $$P_{i/n} = p^i (1-p)^{n-i} (N,i),$$

where (N,i) represents the number of different choices of i elements from N total. As the Bluetooth header generally employs a rate-1/3 repeat coding, the rate p is used here to refer to the probability of a single bit error. For N=10 in the case of the Bluetooth header, Table 1 estimates the erasure rate versus p with or without header error correction according to some embodiments of the present invention.

TABLE 1

|  | p = 0.1% | p = 1% | p = 5% |
|---|---|---|---|
| HEC erasure - no EC | 1.8% | 16.5% | 62.5% |
| HEC erasure - with EC | 0.015% | 1.4% | 22.5% |

Table 1 illustrates an improvement in frame erasures due to HEC, which may lead to performance improvement in, for example, voice over an SCO link. This result is modeled for an AWGN channel where bit errors are independent, but results may differ for a fading channel where errors are more likely to occur in blocks (i.e., higher probability of multi-bit errors in the header).

Note that there may not be a unique relationship between e and r, which may lead to aliasing of multi-bit errors into the error correction table E. In the case of Bluetooth, where N=10 and M=8, the CRC operation maps the 18-bit errors e into the 8-bit remainders r. Thus, there is some probability of falsely detecting a single-bit error when, in fact, there exists a multi-bit error in the received header x that has the same remainder r. It can be shown that all single bit errors have a unique r. The probability of a random error pattern aliasing on one of the N remainder vectors in E can be calculated as:

$$P_a = N/2^M \sim 4\%$$

Thus, approximately 96% of the multi-bit errors should be detected by the CRC check while the remaining 4% may be falsely detected and "corrected" by the EC table as single bit errors. The table below shows the effect of this for various values of p. Again, these results are modeled only for a channel with independent bit errors.

|  | p = 0.1% | p = 1% | p = 5% |
|---|---|---|---|
| HEC erasure- no EC | 0.018 | 0.165 | 0.625 |
| HEC erasure - with EC | $1.44 \times 10^{-3}$ | 0.0134 | 0.216 |
| False HEC correction - with HEC | $6 \times 10^{-6}$ | $5.6 \times 10^{-4}$ | $9 \times 10^{-3}$ |

The flowcharts, flow diagrams and block diagrams of FIGS. 2 through 6 illustrate the architecture, functionality, and operation of possible implementations of devices, methods and computer program products for error control according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A method for error control in an ad hoc network having an asynchronous communication mode and a synchronous communication mode, the method comprising:
   receiving a packet including a header and a payload, the header including a header error check (HEC) computed based on the header;
   calculating an error indicator based on the received header;
   forwarding the received payload if the calculated error indicator indicates an error free header;
   modifying the header, only in the synchronous communication mode, based on an error correction table when the calculated error indicator corresponds to a value in the error correction table and forwarding the received payload;
   detecting a received packet error in the synchronous communication mode when the calculated error indicator indicates an error in the header and the calculated error indicator does not correspond to a value in the error correction table; and
   detecting a received packet error in the asynchronous communication mode when the calculated error indicates an error in the header.

2. The method of claim 1 wherein the error indicator comprises a remainder value.

3. The method of claim 1 wherein the header includes n data bits and wherein the error correction table comprises an n-entry table, each of the entries corresponding to an error in an associated one of the data bits.

4. The method of claim 3 wherein the ad hoc network comprises a Bluetooth compliant network and wherein detecting a received packet error further comprises discarding the received payload.

5. The method of claim 4 wherein the header has an eighteen bit length and wherein the HEC comprises eight bits of the header.

6. The method of claim 4 wherein the received header comprises a repeat coded header and wherein receiving the packet includes demodulating the repeat coded header to provide the header including the HEC.

7. The method of claim 1 wherein detecting a received packet error further comprises discarding the received payload and wherein the header further includes a destination device address and wherein modifying the header comprises determining a destination device address based on the modified header and forwarding the received payload when the determined destination device address corresponds to an expected destination device address and detecting a received packet error and discarding the received payload when the determined destination device address does not correspond to the expected destination device address.

8. The method of claim 1 further comprising:
   negotiating a synchronous connection-oriented (SCO) link to establish the synchronous communication mode;
   associating a frame time with the SCO link; and
   characterizing a packet received at about the frame time as a synchronous communication mode received packet; and
   wherein modifying the header, only in the synchronous communication mode, comprises modifying the header only for synchronous communication mode received packets.

9. The method of claim 8 wherein the header further includes a destination device address, the method further comprising:
   characterizing packets not received at about the frame time as asynchronous communication mode received packets; and
   wherein forwarding the received payload comprises forwarding the received payload for asynchronous communication mode received packets having a destination device address corresponding to an expected destination device address and discarding the received payload for asynchronous communication mode received packets having a destination device address not corresponding to the expected destination device address.

10. The method of claim 9 wherein modifying the header comprises, for synchronous mode received packets, forwarding the received payload when the determined destination device address corresponds to the expected destination device address and detecting a received packet error and discarding the received payload when the determined destination device address does not correspond to the expected destination device address.

11. The method of claim 10 wherein the error indicator comprises a remainder value and wherein calculating the remainder value comprises calculating the remainder value based on a generator polynomial and an initial value known to a device receiving a packet and a device transmitting the packet.

12. The method of claim 11 wherein negotiating a synchronous connection-oriented (SCO) link includes establishing the initial value for the SCO link.

13. The method of claim 12 further comprising:
estimating a bit error rate for the SCO link; and
disabling modifying the header when the estimated bit error rate fails to satisfy an error correction criterion.

14. A communication device for an ad hoc network having an asynchronous communication mode and a synchronous communication mode, the device comprising:
a receiver configured to receive a packet including a header and a payload, the header including a header error check (HEC) computed based on the header;
an error detect circuit configured to calculate an error indicator based on the received header;
an error correction circuit configured to modify the header based on an error correction table when the calculated error indicator corresponds to a value in the error correction table, the error correction circuit being configured to modify the header only in the synchronous communication mode; and
a payload processing circuit configured to forward the received payload when the calculated error indicator indicates an error free header and/or when the error correction circuit modifies the header and to detect a received packet error when the calculated error indicator indicates an error in the header and the calculated error indicator does not correspond to a value in the error correction table in the synchronous communication mode and to detect a received packet error in the asynchronous communication mode when the calculated error indicator indicates an error in the header.

15. The device of claim 14 wherein the error indicator comprises a remainder value.

16. The device of claim 14 wherein the header includes n data bits and wherein the error correction table comprises an n-entry table, each of the entries corresponding to an error in an associated one of the data bits.

17. The device of claim 16 wherein the ad hoc network comprises a Bluetooth compliant network and wherein the payload processing circuit is further configured to discard the received payload if a received packet error is detected.

18. The device of claim 14 wherein the payload processing circuit is further configured to discard the received payload if a received packet error is detected and wherein the header further includes a destination device address and wherein the error correction circuit is further configured to determine a destination device address based on the modified header and wherein the payload processing circuit is further configured to forward the received payload when the determined destination device address corresponds to an expected destination device address and to detect a received packet error and discard the received payload when the determined destination device address does not correspond to the expected destination device address.

19. The device of claim 14 further comprising:
means for negotiating a synchronous connection-oriented (SCO) link to establish the synchronous communication mode;
means for associating a frame time with the SCO link; and
means for characterizing a packet received at about the frame time as a synchronous communication mode received packet; and
wherein the error correction circuit is configured to modify the header only for synchronous communication mode received packets.

20. The device of claim 19 wherein the header further includes a destination device address, the device further comprising:
means for characterizing packets not received at about the frame time as asynchronous communication mode received packets; and
wherein the payload processing circuit is configured to forward the received payload for asynchronous communication mode received packets having a destination device address corresponding to an expected destination device address and discard the received payload for asynchronous communication mode received packets having a destination device address not corresponding to the expected destination device address.

21. The device of claim 20 wherein the payload processing circuit is configured, for synchronous mode received packets, to forward the received payload when the determined destination device address corresponds to the expected destination device address and to detect a received packet error and discard the received payload when the determined destination device address does not correspond to the expected destination device address.

22. The device of claim 21 further comprising:
means for estimating a bit error rate for the SCO link; and
wherein the error correction circuit is configured to disable modifying the header when the estimated bit error rate fails to satisfy an error correction criterion.

23. The device of claim 14 wherein the device comprises a mobile terminal.

* * * * *

UNITED STATES PATENT AND TRADEMARK OFFICE
CERTIFICATE OF CORRECTION

PATENT NO.        : 7,443,785 B2                                              Page 1 of 1
APPLICATION NO. : 10/803139
DATED             : October 28, 2008
INVENTOR(S)       : Bloebaum It is certified that error appears in the above-identified patent and that said Letters Patent is hereby corrected as shown below:

On the Title Page:

Item [22] Filed:   Please correct "March 18, 2004" to read -- March 17, 2004 --

Signed and Sealed this

Sixth Day of January, 2009

JON W. DUDAS
*Director of the United States Patent and Trademark Office*